United States Patent [19]
Burst

[11] 3,933,136
[45] Jan. 20, 1976

[54] COOLING APPARATUS FOR PASSENGER MOTOR VEHICLE

[75] Inventor: Hermann Burst, Stuttgart, Germany

[73] Assignee: Dr. -Ing H.c.F. Porsche Aktiengesellschaft, Germany

[22] Filed: Feb. 8, 1974

[21] Appl. No.: 440,757

[30] Foreign Application Priority Data
Feb. 9, 1973 Germany............................ 2306517

[52] U.S. Cl. ............ 123/41.58; 123/41.64; 165/51; 180/54 A
[51] Int. Cl.² .......................................... F01P 7/00
[58] Field of Search........... 123/41.58, 41.59, 41.63, 123/41.64, 41.65, 41.66, 196 AB; 165/51; 180/68 R, 54 A

[56] References Cited
UNITED STATES PATENTS

| | | | |
|---|---|---|---|
| 1,286,776 | 12/1918 | Remmen.......................... | 123/41.58 |
| 1,611,658 | 12/1926 | Magni.............................. | 123/41.58 |
| 1,943,665 | 1/1934 | Freeman.......................... | 180/54 A |
| 2,115,124 | 4/1938 | Schittke........................... | 180/54 A |
| 2,223,262 | 11/1940 | Merkle............................. | 180/54 A |
| 2,358,663 | 9/1944 | Scott-Iversen .................... | 180/54 A |
| 2,511,549 | 6/1950 | Simi................................ | 180/54 A |
| 2,524,798 | 10/1950 | Hoskinson ...................... | 123/196 AB |
| 2,697,490 | 12/1954 | Taber............................... | 180/54 A |
| 2,913,065 | 11/1959 | Lyon................................ | 180/54 A |
| 3,616,871 | 11/1971 | West................................ | 180/54 A |

Primary Examiner—Charles J. Myhre
Assistant Examiner—Daniel J. O'Connor
Attorney, Agent, or Firm—Craig & Antonelli

[57] ABSTRACT

Cooling apparatus for cooling an engine on a motor vehicle including at least one heat exchanging cooler extending transversely of the motor vehicle and arranged below a storage compartment at one end of the vehicle. To enhance the flow of cooling air through the cooler, an air deflection member is provided adjacent the exit end of the coolers, which deflection member causes a vacuum suction at the exit end of the cooler in response to air flowing past the vehicle at high speed during driving of the vehicle. Adjacent the forward end of the air entrance to the coolers, an upwardly extending opening is provided between an endmost bumper and vehicle body parts forming a tire storage compartment, which upwardly extending opening also creates a vacuum suction effect at the entrance to the coolers in response to air flowing over the outside of the vehicle adjacent the bumper and a hood covering the storage compartment. In preferred embodiments, a pair of coolers are arranged which are inclined downwardly in the forward direction of the vehicle, with the most forward of the coolers being approximately one-half the vertical height of the most rearward of the coolers, and with the inlet air deflecting means being designed to direct a greater portion of inlet air to the lower half of the combination of coolers than to the upper half thereof. Another preferred embodiment with a single vertical cooler includes a blower at the rear of the cooler for enhancing the flow of air therethrough as well as a partition between the lower air deflector and the cooler.

32 Claims, 3 Drawing Figures

COOLING APPARATUS FOR PASSENGER MOTOR VEHICLE

BACKGROUND AND SUMMARY OF THE INVENTION

The present invention relates to an improved cooling apparatus for vehicles, especially for passenger motor cars of the type having at least one cooler extending transverse to the driving direction. The present invention is particularly related to an arrangement for the guidance of the cooling air supplied to the coolers. It will be understood that these coolers are of the type which include a fluid medium, such as engine coolant and/or lubricating oil, which passes in heat exchanging relationship with respect to the cooling air.

A motor vehicle has been contemplated (FR-PS 1075 582) which is provided with a cooler in the nose or front portion and which includes a cooling air guide arrangement. The air guide arrangement in this vehicle is constructed with a channel forward of the cooler and an opening arranged at the topside of the vehicle provided with a flap. However, this arrangement has the disadvantage that the nose space construction, which accommodates the channel passage, is such as to make it difficult to also accommodate housing of aggregates and provisions of a luggage and/or engine space. Further, by changing the direction of the air stream to the opening at the vehicle topside, the internal air resistance and therewith also the driving resistance acting on the vehicle is increased.

The present invention contemplates overcoming the above-mentioned disadvantages by providing an arrangement for the guidance of the cooling air admitted to the coolers so as to produce a minimum amount of air resistance and so as not to impair the utilization of the nose space of the vehicle for storage and engine compartments and the like. The present invention further contemplates arranging the air inlet for the cooler entirely below a forward bumper of the vehicle, with the further provision of simple air deflecting means for optimizing the velocity distribution of the cooling air at the inlet side of the respective coolers. In preferred embodiments of the invention, the cooler or coolers are arranged in an inclined position with the bottom side of the cooler arranged forwardly of the topside thereof so as to maximize the cross section of the inlet to the cooler, while minimizing the vertical space taken up in the vehicle nose section. In conjunction with this inclined cooler arrangement, air guide devices are provided for equalizing and optimizing the distribution of cooling air over the inlet side of the coolers.

The present invention further contemplates provision of air guide devices which effect an air distribution at the side of the cooling air entrance and a vacuum at the cooling air exit side, which vacuum is a function of the vehicle driving velocity. In particular preferred embodiments, the air guide devices for the air exit side extend below the cooler and essentially perpendicular to the driving direction of the vehicle. This air guide device at the exit is arranged or attached at a lower closure wall of the vehicle body and is configured so as to assure a speed up in the air flowing thereby so as to create the vacuum effect at the exit side of the cooler.

In preferred embodiments, the air guide devices at the cooling air entrance side of the coolers are constructed so as to have a plurality of compartments of separated flow paths. These compartments are shaped such that the cooling air discharged therefrom to the inlet surface of the cooler is distributed appropriately over the surface of the cooler. In a particularly preferred embodiment, these compartments are formed by a common air inlet device inserted between the bottom wall of a storage compartment and the bottom wall of the vehicle body and adjacent and slightly rearward of a forward bumper of the vehicle.

In preferred embodiments with the coolers inclined downwardly in the forward direction, the coolers are directly attached at a lower closure wall of the vehicle body. In other preferred embodiments with a vertically extending cooler, a partition is provided between the lower enclosure wall and the cooler for closing off the space between the lower enclosure wall and the cooler and for accommodating attachment of a vertically extending cooler and a similar body construction as for the inclined coolers.

In preferred embodiments, two separate cooling units are arranged one behind the other in the driving direction with the front cooler being constructed substantially smaller in height than the rear cooler and covering essentially the lower region of the rear cooler. In these preferred embodiments, the air inlet guide devices are constructed so as to direct a greater portion of the inlet air to the lower portion of the cooler than to the upper portion.

Preferred embodiments of the invention also include an upwardly extending opening at the air entrance side, which upwardly extending opening, in conjunction with adjacent vehicle bumper and hood parts, creates a vacuum suction effect during driving of the vehicle.

The cooling apparatus arrangements of the present invention all exhibit advantages with respect to the guidance of the cooling air into communication with the cooler or coolers. The deflecting arrangement at the bottom of the vehicle for producing a vacuum at the exit side of the coolers assures the smooth conductance away of the cooling air from the coolers. Since the air guide device for creating the vacuum at the exit side of the coolers is formed by a simple part provided at a lower closure wall of the vehicle body which extends perpendicularly to the driving direction of the vehicle, the construction thereof is particularly economical and reliable. By providing that the air inlet guide devices are arranged exclusively below the bumper, a good distribution of the free air stream in front of the vehicle into the coolers is obtained. With the cooling air entrance being disposed below the bumper, with the inlet velocity distribution being varied over the vertical height thereof as a function of the predetermined mounting height of the bumper and the predetermined batter angle (angle from the point of contact of the vehicle wheels to the deflecting edge underneath the cooler at the exit side thereof), a particularly advantageous controlled design for the cooling apparatus can be provided by appropriate selection of the height of the cooler. In this connection, it is noted that the variable velocity distribution at the inlet disposed underneath the bumper is such that a higher velocity air is provided to the lower portion of the cooler. To maximize utilization of this phenomenon with higher velocity air in the lower portion of the cooler, two coolers of different size are arranged one behind the other in the direction of driving, in accordance with preferred embodiments of the invention. In these last-mentioned preferred embodiments, the front cooler is advantageously made smaller than the rear cooler so as not to obstruct the upper portion of the rear cooler.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
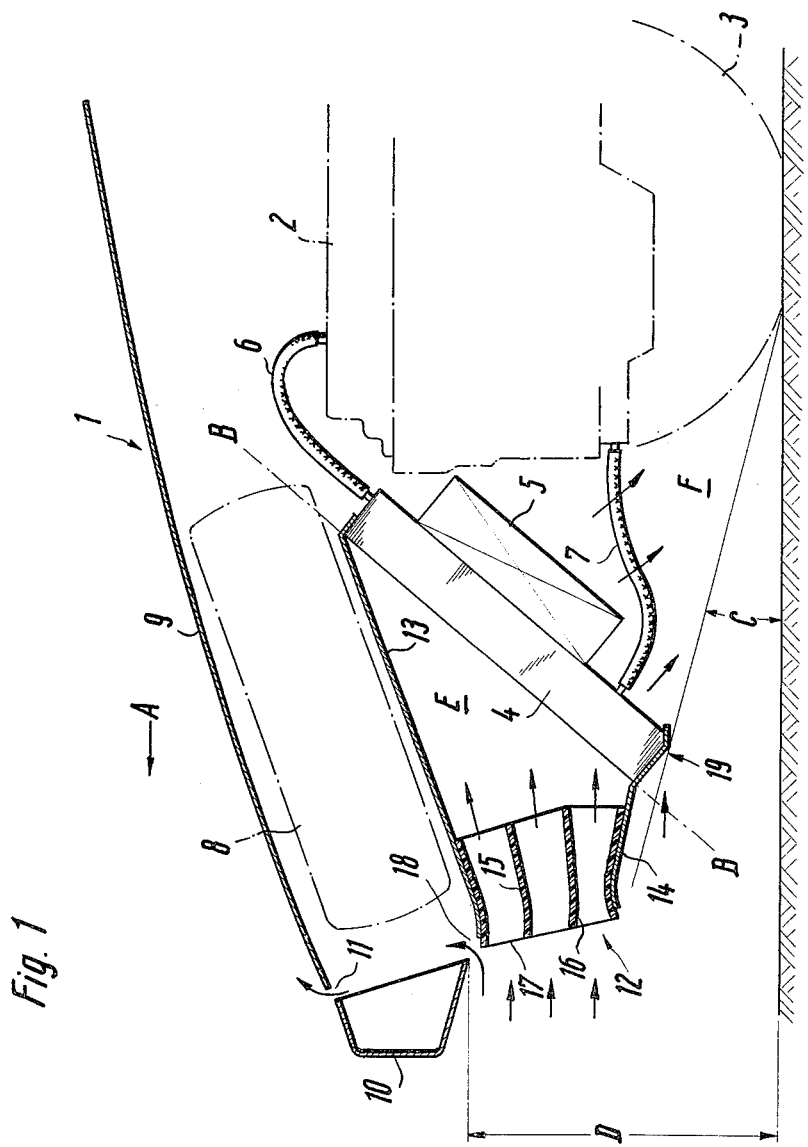
FIG. 1 is a schematic partial side view of a motor vehicle with the cooling apparatus of the present invention mounted thereon.

The motor vehicle 1, the nose or front portion only being shown in the drawings for the sake of clarity of representation (it being understood that the vehicle is a passenger motor vehicle with a passenger space rearwardly of the portion depicted in the drawing and with a rear set of wheels also being provided at the rear end thereof) includes an internal combustion engine 2 and front wheels 3. Arrow A indicates the forward driving direction of the vehicle.

A cooler 4 with a housing 5 is positioned forwardly of the engine 2. This cooler 4 extends crosswise the vehicle essentially perpendicular to the driving direction A. The cooler 4 is arranged inclined in the vehicle in such a way that its plane of inclination B—B is inclined from the top to the bottom in the forward driving direction A. Coolant supply and return lines 6, 7, connect engine 2 with the cooler 4, and accommodate circulation of an engine coolant through the cooler.

A spare wheel compartment accommodating a spare wheel 8 is provided above the cooler 4. The spare wheel 8 is covered by a structural wall 9 of the vehicle body. The structural wall 9 or an adjacent wall is provided as a portion of an openable hood or cover to provide access to the spare wheel 8 (the details of such hood are not illustrated in detail for clarity of representation of the invention). A bumper 10 forms the forward nose boundary of the motor vehicle. Bumper 10 and structural wall 9 are connected to one another in such a manner as to form a upwardly facing opening 11. This opening 11 is positioned in a zone of the vehicle which experiences a vacuum suction effect during driving of the vehicle due to the flow of air over the bumper and adjacent vehicle body outer parts.

Beneath the bumper 10, a cooling air entrance opening 12 is provided. The size of this opening 12 is determined essentially by the batter angle C and a mounting height D of the bumper 10.

Walls 13, 14 extend from the opening 12 to form a channel leading to the cooler 4 on the entrance side E of the cooler 4.

Between the walls 13, 14 in the area of the entrance opening 12, air guide devices 15, 16 are provided. These air guide devices 15, 16 are formed such that a distribution of the cooling air supplied to the slanted cooler 4 is effected. These air guide devices 15, 16 together form an air entrance device 17 which is preferably made of synthetic materials, preferably synthetic resinous materials.

The upper area of the air inlet device 17 (the wall 13 forming the upper side of the inlet opening 12) is displaced in relation to the lower edge of the bumper 10 so as to form a gap 18 therebetween. This gap 18 facilitates communication of air with the opening 11 so as to accommodate creation of the suction effect at the inlet side of the inlet opening 12 by way of the air flow over the vehicle body adjacent opening 11.

On the wall 14 which forms a lower closing wall of the vehicle, a further air guide device (air deflecting portion) 19 is provided. This air guide device 19 is arranged below the cooler 4 and extends crosswise to the direction of driving along the width of the cooler 4. Due to the exterior configuration of the wall 14 at device 19 (in relationship to the ground), a vacuum is created at the cooling air discharge side F in dependence on the driving speed of the vehicle. This created vacuum at the exit side F assists in the discharge of cooling air from the cooler. That is, the created vacuum at the exit side F enhances the throughflow of cooling air through the cooler or coolers.

Figure 2:
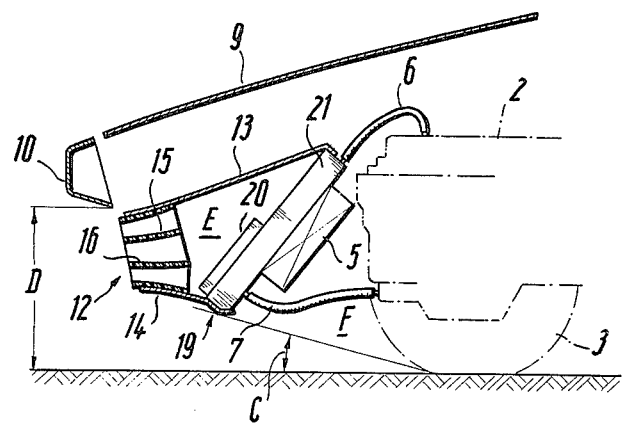
FIG. 2 is a view similar to FIG. 1 showing another preferred embodiment of cooling apparatus attached to a motor vehicle in accordance with the present invention.

In the preferred embodiment illustrated in FIG. 2, two coolers 20, 21 are arranged one behind the other as viewed in the direction of driving. The front cooler 20 is provided for the cooling of lubricating oil for the engine, with appropriate lubricant oil inlet and discharge lines (not illustrated) being provided. This front cooler 20 is approximately half the height of the rear cooler 21, which rear cooler 21 preferably is constructed as a cooler for engine coolant such as water and the like, and essentially covers the lower area of this cooler 21. This orientation of the coolers 20 and 21 takes advantage of the experienced velocity distribution at the inlet 12, which velocity distribution includes a higher velocity air flow at the lower portion than at the upper portion of the inlet 12. This experienced velocity distribution at the inlet 12 is determined by the batter angle C, the size of the cooling air entrance opening 12, the height D of the bumper 10, and the height of the cooler 21.

Figure 3:
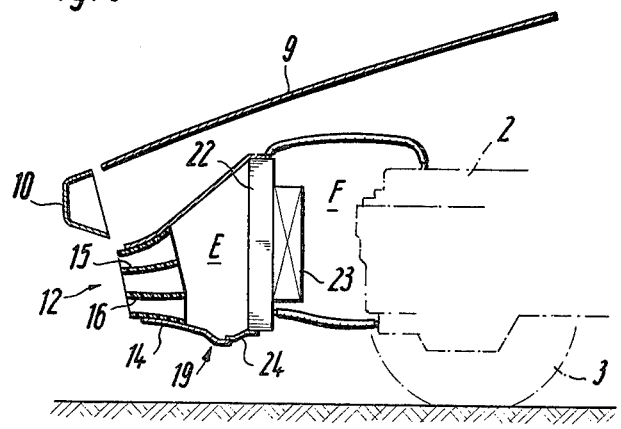
FIG. 3 is a view corresponding to FIG. 1 which illustrates a still further preferred embodiment of the present invention.

In the embodiment according to FIG. 3, a cooler 22 is provided which includes a blower 23 at the rear side thereof. This cooler 22 is positioned in a vertically extending plane which extends crosswise of the vehicle driving direction. In this embodiment, a partition 24 is provided between the wall 14 and the cooler 22 so as to provide an advantageous construction of the cooling air inlet side E and discharge side F for the cooling installation.

The operation of the cooling apparatus of the present invention is explained as follows with respect to the embodiment of FIG. 1. During driving of the vehicle, cooling air flows through the inlet opening 12 and is equally divided at the surface of the cooler 4 by means of the air guide devices 15, 16. At the same time, the air stream discharging from the cooler 4 downstream of the device 19, is conducted away in such manner downwardly towards the drive path of the vehicle that a vacuum is formed at the cooling air discharge side F. By means of this vacuum, the air stream which is passed through cooler 4 is conducted downwardly towards the roadway, with the slanted arrangement of the cooler 4 rendering an especially good cooling air discharge. The flow of the cooling air through the cooler 4 is also effectively increased by the opening 11 (which opens to a vacuum zone at the upper surface of the nose portion of the vehicle) and the gap 18 below the bumper 10 for communicating air to the opening 11. Through these measures, the velocity distribution of the air, especially with a slanted cooler, becomes more uniform.

Since opening 11 is located in a zone of the vehicle which experiences vacuum during driving, the opening 18 near the top of inlet opening 12 aides in increasing the velocity of air supplied to the top of inlet opening 12 (this aids in air distribution to the cooler).

In all of the illustrated embodiments the novel cooling air guidance apparatus of the present invention assures optimum supply of air to the coolers, in spite of the minimal vertical air inlet opening height (dictated by angle C and height D) as compared to the vertical extent of the coolers.

The operation of the embodiments of FIGS. 2 and 3 is analogous to that described above for FIG. 1, with corresponding differences due to the inclination of the coolers and the number of coolers arranged within the vehicle nose portion.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Cooling apparatus for cooling an engine on a motor vehicle comprising:
    at least one cooler including means for exchanging heat between cooling air flowing therethrough and an engine cooling medium,
    and cooling air guide means for guiding the flow of cooling air to and from said at least one cooler, said guide means including vacuum producing means for producing a cooling air flow inducing vacuum at said cooler in dependence on a driving speed of a vehicle so as to optimize the distribution of cooling air over said cooler,
    wherein said vacuum producing means includes means for inducing a vacuum both the inlet side and the outlet side of said at least one cooler.

2. Apparatus according to claim 1, wherein each of said at least one coolers extends perpendicular to longitudinal driving direction of a vehicle and exhibits a cooling air entrance side which faces substantially in the driving direction, and wherein said guide means includes inlet air guide means for directing cooling air into said cooler in a direction opposite said driving direction and in a predetermined cooling air distribution over said cooling air entrance side.

3. Apparatus according to claim 2, wherein said inlet air guide means is constructed with at least two compartment walls forming separate compartments for inflow of air from outside of the vehicle to said air entrance side.

4. Apparatus according to claim 3, wherein said compartment walls are contoured for effecting said predetermined cooling air distribution over said air entrance side.

5. Apparatus according to claim 4, wherein all of said compartment walls are formed in a single common unit formed of synthetic material.

6. Apparatus according to claim 2, wherein each of said at least one coolers is disposed with the cooling air entrance side disposed in a plane which is inclined from top to bottom in said driving direction.

7. Apparatus according to claim 2, wherein two of said coolers are provided, one immediately behind the other in said driving direction, and wherein the most forward of said coolers is considerably smaller than the most rearward of said coolers and is disposed to cover the lower area of said most rearward of said coolers.

8. Apparatus according to claim 7, wherein the vertical height of said most forward of said coolers is approximately one half the vertical height of said most rearward of said coolers.

9. Apparatus according to claim 8, wherein said most forward cooler is an engine lubricating oil cooler, and wherein said most rearward cooler is a water cooler for an engine.

10. Apparatus according to claim 9, wherein said cooling air guide means includes means for directing a greater portion of cooling air to lower portions of said coolers than to the upper area thereof.

11. Apparatus according to claim 1, wherein said vacuum producing means are arranged to equalize the distribution of cooling air over the inlet side of the cooler.

12. Apparatus according to claim 1, wherein said at least one cooler is arranged in front of an engine of said vehicle with a cooler exit side facing in a direction toward said engine.

13. Apparatus according to claim 1, wherein said at least one cooler has an exit side which at least partially faces a front end of an engine of said vehicle.

14. Apparatus according to claim 1, wherein said exit side at least partially faces the ground.

15. Apparatus according to claim 1, wherein said vacuum producing means comprises static means.

16. Apparatus according to claim 1, wherein said cooling air guide means comprises facing wall means which define a cooling air conduit, and wherein said vacuum producing means comprise an upwardly directed hole in an upper body portion of the vehicle, which hole is communicated with a cooling air inlet defined by said wall means.

17. Apparatus according to claim 1, wherein said apparatus is mounted on said vehicle.

18. Cooling apparatus for cooling an engine on a motor vehicle comprising:
    at least one cooler including means for exchanging heat between cooling air flowing therethrough and an engine cooling medium,
    and cooling air guide means for guiding the flow of cooling air to and from said at least one cooler, said guide means including vacuum producing means for producing a cooling air flow inducing vacuum at said cooler in dependence on a driving speed of a vehicle so as to optimize the distribution of cooling air over said cooler,
    wherein each of said at least one cooler extends perpendicular to a longitudinal driving direction of the vehicle and exhibits a cooling air entrance side which faces substantially in the driving direction, and wherein said guide means includes inlet air guide means for directing cooling air into said cooler in a direction opposite said driving direction and in a predetermined cooling air distribution over said cooling air entrance side, wherein said at least one cooler exhibits a cooling air exit side which faces substantially opposite said driving direction, wherein said vacuum producing means includes exit air deflecting means extending substantially perpendicular to said driving direction and adjacent a bottom portion of said exit side, said exit air deflecting means including means for inducing vacuum downstream of said exit side in response to air flow around said exit air deflecting means.

19. Apparatus according to claim 18, wherein said exit air deflecting means is arranged at a lower enclosure wall forming a portion of a body of the vehicle.

20. Apparatus according to claim 19, wherein the air entrance sides of each of said at least one coolers extend in a vertical plane, and wherein a partition is provided between said exit air deflecting means and the respective air entrance side of one of said coolers.

21. Apparatus according to claim 18, wherein said vehicle is a wheeled passenger motor vehicle and wherein said at least one cooler is arranged intermediate front wheels and a front bumper of said vehicle and below a storage compartment for a vehicle tire.

22. Cooling apparatus for cooling an engine on a motor vehicle comprising:
   at least one cooler including means for exchanging heat between cooling air flowing therethrough and an engine cooling medium,
   and cooling air guide means for guiding the flow of cooling air to and from said at least one cooler, said guide means including vacuum producing means for producing a cooling air flow inducing vacuum at said cooler in dependence on a driving speed of a vehicle so as to optimize the distribution of cooling air over said cooler,
   wherein each of said at least one cooler extends perpendicular to a longitudinal driving direction of the vehicle and exhibits a cooling air entrance side which faces substantially in the driving direction, and wherein said guide means includes inlet air guide means for directing cooling air into said cooler in a direction opposite said driving direction and in a predetermined cooling air distribution over said cooling air entrance side,
   wherein said vehicle includes a bumper at the most forward end thereof, and wherein said vacuum producing means includes an upwardly extending opening between said bumper and said at least one cooler.

23. Apparatus according to claim 22, wherein said vehicle includes a storage compartment having an openable hood at the top thereof, said storage compartment being arranged in front of a passenger space of said vehicle, each of said at least one coolers being disposed below said storage compartment, said upwardly extending opening communicating with said storage compartment and extending upwardly to outside said vehicle at a position intermediate the forward end of said hood and said bumper, said hood and bumper being configured to form a vacuum in said storage compartment at the inlet to said at least one cooler in response to the air flow over said vehicle during driving thereof.

24. Apparatus according to claim 23, wherein said at least one cooler exhibits a cooling air exit side which faces substantially opposite said driving direction, wherein said vacuum producing means includes exit air deflecting means extending substantially perpendicular to said driving direction and adjacent a bottom portion of said exit side, said exit air deflecting means including means for inducing vacuum downstream of said exit side in response to air flow around said exit air deflecting means.

25. Apparatus according to claim 24, wherein said exit air deflecting means is arranged at a lower enclosure wall forming a portion of a body of the vehicle.

26. Apparatus according to claim 23, wherein each of said at least one coolers is disposed with the cooling air entrance side disposed in a plane which is inclined from top to bottom in said driving direction.

27. Apparatus according to claim 26, wherein two of said coolers are provided, one immediately behind the other in said driving direction, and wherein the most forward of said coolers is considerably smaller than the most rearward of said coolers and is disposed to cover the lower area of said most rearward of said coolers.

28. Apparatus according to claim 27, wherein the vertical height of said most forward of said coolers is approximately one half the vertical height of said most rearward of said coolers.

29. Apparatus according to claim 28, wherein said cooling air guide means includes means for directing a greater portion of cooling air to lower portions of said coolers than to the upper area thereof.

30. Cooling apparatus for cooling an engine on a motor vehicle comprising:
   at least one cooler including means for exchanging heat between cooling air flowing therethrough and an engine cooling medium,
   and cooling air guide means for guiding the flow of cooling air to and from said at least one cooler, said guide means including vacuum producing means for producing a cooling air flow inducing vacuum at said cooler in dependence on a driving speed of a vehicle so as to optimize the distribution of cooling air over said cooler,
   wherein said vacuum producing means includes deflecting means adjacent an exit side of said cooler adjacent a bottom portion of an engine of said vehicle.

31. Cooling apparatus for cooling an engine on a motor vehicle comprising:
   at least one cooler including means for exchanging heat between cooling air flowing therethrough and an engine cooling medium,
   and cooling air guide means for guiding the flow of cooling air to and from said at least one cooler, said guide means including vacuum producing means for producing a cooling air flow inducing vacuum at said cooler in dependence on a driving speed of a vehicle so as to optimize the distribution of cooling air over said cooler,
   wherein said vacuum producing means includes wall means extending between a bottom portion of a cooling air guide means inlet and a bottom portion of said cooler such that a vacuum is produced at said cooler in response to cooling air flow around a bottom wall of said wall means.

32. Cooling apparatus for cooling an engine on a motor vehicle comprising:
   at least one cooler including means for exchanging heat between cooling air flowing therethrough and an engine cooling medium,
   and cooling air guide means for guiding the flow of cooling air to and from said at least one cooler, said guide means including vacuum producing means for producing a cooling air flow inducing vacuum at said cooler in dependence on a driving speed of a vehicle so as to optimize the distribution of cooling air over said cooler, wherein said vacuum producing means includes means for inducing a vacuum at least at an inlet side of said at least one cooler.

* * * * *

UNITED STATES PATENT OFFICE
CERTIFICATE OF CORRECTION

Patent No. 3,933,136         Dated January 20, 1976

Inventor(s) Hermann BURST

It is certified that error appears in the above-identified patent and that said Letters Patent are hereby corrected as shown below:

Title Page, left-hand column,
 [30] Foreign Application Priority Data, which now reads:

"Feb. 9, 1973     Germany..........2306517"

should read as follows:

--Feb. 9, 1973     Germany..........2306317--

Signed and Sealed this

Twenty-seventh Day of July 1976

[SEAL]

Attest:

RUTH C. MASON
*Attesting Officer*

C. MARSHALL DANN
*Commissioner of Patents and Trademarks*